United States Patent
Momtahan et al.

(10) Patent No.: US 10,797,792 B1
(45) Date of Patent: Oct. 6, 2020

(54) DISTRIBUTED NETWORK DIAGNOSTICS

(71) Applicant: Amazon Technologies, Inc., Reno, NV (US)

(72) Inventors: Omid Momtahan, Palo Alto, CA (US); Waruna Fernando, San Jose, CA (US); Poorya Saghari, San Jose, CA (US); Venkata Satish Kumar Vangala, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/217,841

(22) Filed: Dec. 12, 2018

(51) Int. Cl.
*H04B 10/079* (2013.01)
*H04B 10/25* (2013.01)

(52) U.S. Cl.
CPC ......... *H04B 10/0791* (2013.01); *H04B 10/25* (2013.01)

(58) Field of Classification Search
None
See application file for complete search history.

(56) References Cited

U.S. PATENT DOCUMENTS

| | | | | |
|---|---|---|---|---|
| 6,075,630 A * | 6/2000 | Nishio | ............ | H04J 14/0227 398/1 |
| 2004/0208501 A1 * | 10/2004 | Saunders | ............ | H04B 10/0793 398/9 |
| 2008/0005156 A1 * | 1/2008 | Edwards | ............ | H04L 29/06027 |
| 2009/0324237 A1 * | 12/2009 | Pan | ............ | H04B 10/40 398/135 |
| 2016/0204864 A1 * | 7/2016 | Linney | ............ | H04L 12/2858 398/72 |
| 2017/0033865 A1 * | 2/2017 | Frankel | ............ | H04J 14/0269 |

* cited by examiner

*Primary Examiner* — David W Lambert
(74) *Attorney, Agent, or Firm* — Hogan Lovells US LLP

(57) ABSTRACT

Information from optical modules can be combined with information from network switches to help detect and pinpoint problems along a network communications path. A control path between a network switch and a microcontroller of an optical module can be used to obtain monitoring and debugging data from a digital signal processor (DSP) of the optical module. The DSP data can be used with performance data from the network switch to separately determine the health of the electrical and optical sections of the communications link. The ability to pinpoint problems with the communications link enables appropriate remedial actions to be determined and taken automatically.

20 Claims, 7 Drawing Sheets

DISTRIBUTED NETWORK DIAGNOSTICS

BACKGROUND

As computing technology continues to advance, an increasing amount of data is being processed and stored electronically. This can require a very large and complex network of computing devices that may need to transfer data over very large distances. There will occasionally be problems with components across the network, such as where a communication link between two components begins to fail. Since only a subset of these components is able to provide diagnostic information, the ability to pinpoint these problems without manual intervention can be limited.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for the monitoring and debugging of network communications. In particular, various embodiments obtain information from optical modules that can be combined with information from network switches, and other network components, to help detect and pinpoint problems with a network communications path. Optical modules can convert electrical signals to optical signals, and back, in order to improve network transmissions between network switches. A control path between a network switch and a microcontroller of an optical module can be used to obtain monitoring and debugging data that is generated by a digital signal processor (DSP) of the optical module. In some embodiments the data is obtained directly from the DSP, while in others a microcontroller (MCU) may save some limited diagnostic data into memory, and the switch could obtain the data from the memory on the optical module over the control path. In many embodiments, however, the DSP will provide more advanced data from the optical module that supports a more robust diagnostic tool, both in terms of data and functionality. Implementing such tools using the MCU and memory may be difficult and prone to bugs and errors during the read and retrieve process. The monitoring and debugging data from the DSP can be used with data from the network switch to separately determine the health of the electrical and optical sections of the communications link. The ability to pinpoint problems with the communications link can also enable the appropriate remedial actions to be determined and taken as well.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
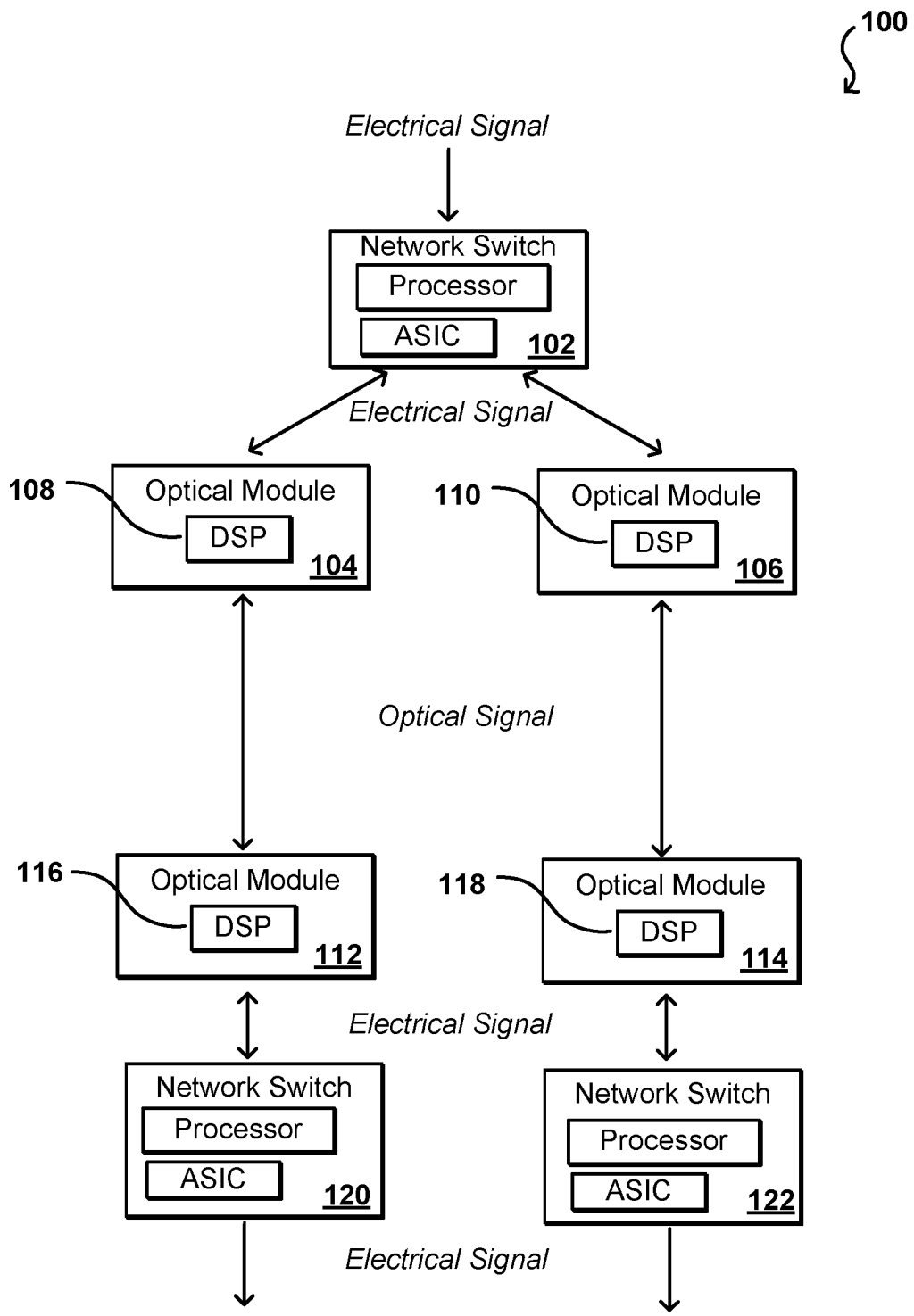
FIG. 1 illustrates a set of example connected networking components that can be utilized in accordance with various embodiments.

FIG. 1 illustrates a set of example networking components 100 that can be utilized in accordance with various embodiments. This example includes a first network switch 102 that can receive data that is to be directed to one of two other network switches 120, 122 in order to propagate data across a network, such as along a portion of a data path between a source device and a destination device. In computing networks such as data centers, for example, there can be many levels (e.g., layers or tiers) of components and many connections between those levels. These can comprise, for example, a hierarchy of network switches connecting various host devices or other resources to an external network. The connections themselves can be made by any appropriate connection mechanism, such as fiber optic cable, network cable, copper wire, etc. In the example of FIG. 1, the network switches 102, 120, 122 communicate using electrical signals. For long communications links between tiers of switches, however, it may be preferred for a number of different reasons to utilize optical signals. Optical signals can be transmitted, for example, at a higher data rate, with a higher bandwidth, over a long distance with relatively little power loss. Accordingly, the network switches can be used to direct the data to an appropriate next switch (or destination, etc.), but can utilize intermediate components such as optical modules to convert the electrical signal to an optical signal for transmission along a significant portion of the communication link or path between the switches. For example, a first pair of optical modules 104, 112 can be used to convert between electrical and optical signals between the transmitting network switch 102 and a first potential target switch 120, while a second pair of optical modules 106, 114 can be used to convert between electrical and optical signals between the transmitting network switch 102 and a second potential target switch 122.

As mentioned, however, it might be the case that one or more of these components might experience a problem or failure. This might include not only one of the network switches or optical modules, but might also include the optical fibers running between the optical modules, or the copper (or other conductive) wire connected to the network switches, or the connection between the optical module and the host switch, among other such options. While diagnostics and monitoring tools are important parts of large network management, conventionally most of the debugging and the monitoring functionalities are implemented on the network switches. For example, a switch can monitor the eye quality of the data being transferred, or have an estimate of bit error rate (BER). For some diagnostic applications, a network switch could generate and send special signal patterns to each port (for example, a pseudorandom binary sequence or PRBS signal) and measure the quality of the link (signal to noise ratio or SNR and BER). While all these functionalities are helpful, they are unable to unambiguously diagnose (or distinguish between problems with) the electrical link (host side) and the optical link (link side) of the optical network.

Advances in the electronics of the optical modules have resulted in the inclusion of additional components and functionality. For example, various pluggable optical modules have digital signal processor (DSP) 108, 110, 116, 118 chips on board. In addition to improving the signal quality, an onboard DSP can provide diagnostics and monitoring capabilities similar to what is available on network switches, among other such capabilities. Example DSP tools can include a set of debugging tools that provides for dividing of the full link between the network switches into several shorter links and, more importantly, monitoring and debugging electrical and optical sections of the link separately. In other words, onboard DSPs can be used to extend the diagnostic and monitoring hubs from the switch into the modules. Debugging tools, as complex functionalities of the DSP, can be enabled in various embodiments in addition to any other data reporting performed by the DSP. To enable a debugging tool or a functionality on the DSP, several parameters and settings need to be transferred from a switch ASIC to the module DSP in various embodiments. Some monitoring parameters that the DSP reports are not available in the normal operating mode, such that the DSP first needs to be set into that proper debugging mode by the switch (i.e., by sending several bytes of data to the DSP corresponding to the appropriate parameters and settings). The DSP can then report the measured and monitoring values back to the switch, which may include several bytes of data. These steps can all be performed using a pass-through mode envisioned for the microcontroller of the optical module as discussed herein.

As an example, the electrical link on a port between a switch and an optical module can be diagnosed. An electrical link from a port on a switch, through the optical module, and back to the same port on the switch (short loop back) can be diagnosed separately. Further, the mixed electrical and optical link between a port on a switch to itself through a module on another switch or port (long loop back if the path is available) can be diagnosed, as well as an optical link between a module and another module. This enables independent and efficient diagnosis and debugging of both the host side (electrical section) and the link side (optical section). In one embodiment, PRBS sequences (with different lengths) can be generated on a switch, and checking its BER on the DSP will also check the electrical link between the switch and the module (up to the DSP). If there is a connection problem between a port on the switch and the corresponding module, such a test can quickly diagnose that problem. In another example, PRBS can be generated on the DSP of a module, and its BER can be checked on another side of the link on the receiving module DSP. Such a test can directly reveal whether there is a problem with optics of the optical modules (including the module optics and fiber link).

Conventionally, the optical modules have provided limited monitoring functionalities. As a result, the control route between the switch and the module is usually a very simple two-line interface with limited speed (for example, I$^2$C with 100 kb/s or 400 kb/s). To be compatible with the legacy optical modules, optical modules with powerful DSPs can use the same limited-control interface with the switch. It should be noted that the DSP high-speed data lines are directly connected to the high-speed data lines arriving and departing from a port on the switch. However, a DSP control interface (with much slower speed) is connected and managed by an onboard microcontroller of the module. That means the same I$^2$C interface to the module is the only gateway for the switch to control and communicate with DSP.

Approaches in accordance with various embodiments can leverage this additional functionality to improve tasks such as network monitoring and debugging. In at least some embodiments, a network switch (and potentially various network management components) can have access to the functionality provided by these onboard DSPs 108, 110, 116, 118. In one embodiment, distributed diagnostic and debugging capabilities are enabled by having a network switch be in control of the module DSP for a relevant optical module in order to manage the proper data flow and measurement. Such architecture can enable the switch to communicate directly with DSP. An approach in accordance with various embodiments utilizes a pass-through connection, such as between the main I$^2$C and DSP I/O ports on an optical module. In other implementations, the DSP and microcontroller for an optical module could share the same I$^2$C line but have assigned different addresses. In that scenario, the switch could directly access the DSP using its address. Various other approaches can be used as well as is discussed and suggested herein.

Figure 2:
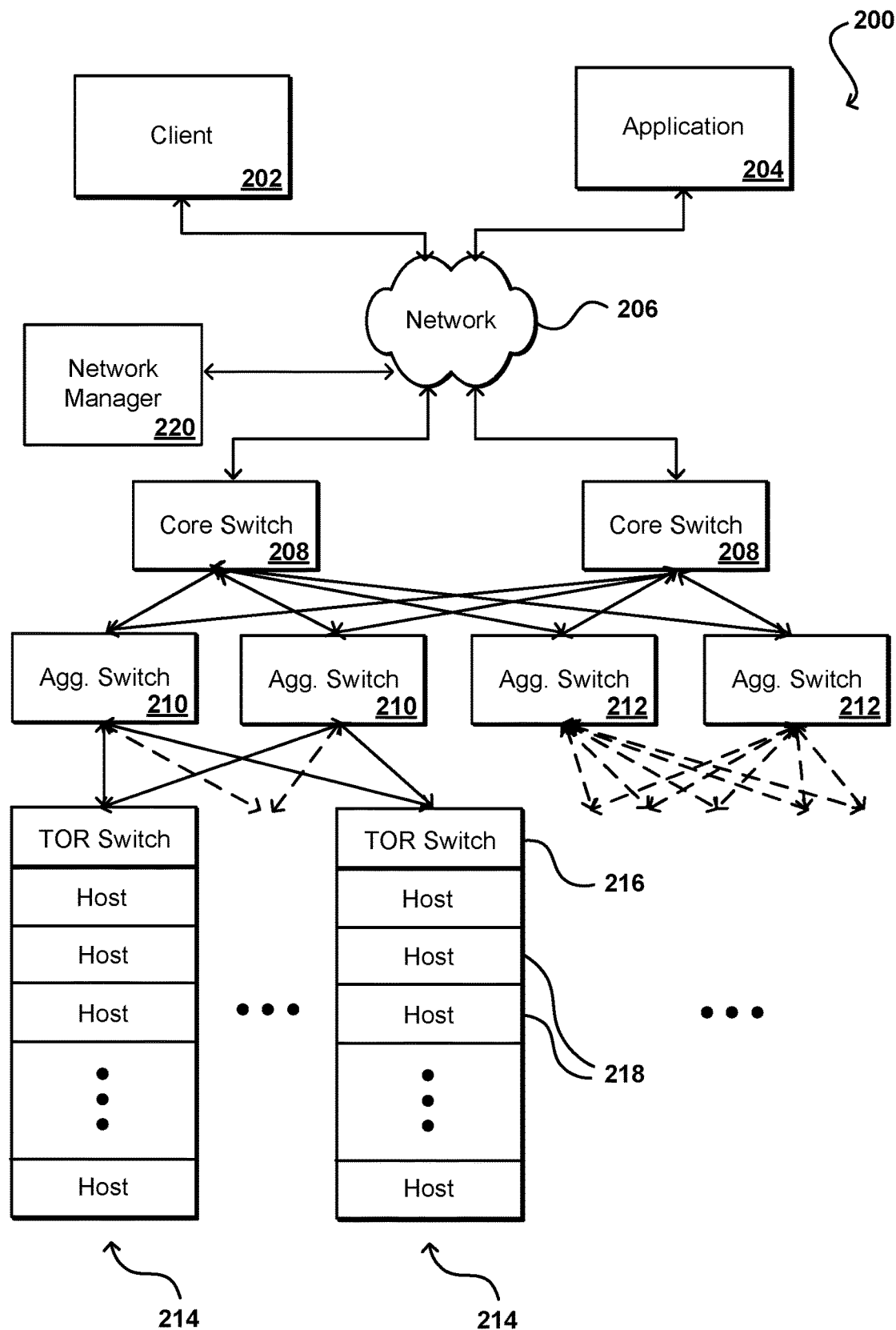
FIG. 2 illustrates an example data center environment that can utilize aspects of the various embodiments.

FIG. 2 illustrates an example network configuration 200 that can be used to route communications between specific host machines or other such devices, as may be used to provide users or applications with access to a variety of distributed resources. This example shows a typical design that can be used for a data center, wherein a source such as a client device 202 or application 204 is able to send requests across a network 206, such as the Internet, to be received by one or more components of the data center. Properties of various components of the network, such as provisioned instances, etc., can be managed using at least one management system, component, or service 220. In this example, the requests are received over the network to one of a plurality of core switches 208, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 208 is able to communicate with each of a plurality of aggregation switches 210, 212, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 210, 212 is linked to a plurality of physical racks 214, each of which typically contains a top of rack (TOR) or "access" switch 216 and a plurality of physical host machines 218, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as 120 racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 206. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 3:
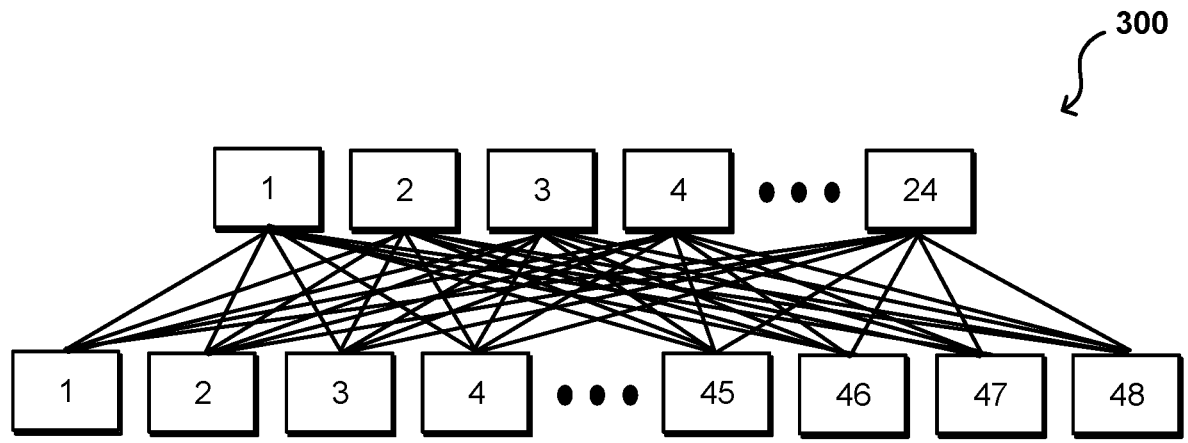
FIG. 3 illustrates a set of interconnected network switches that can be utilized to implement aspects of the various embodiments.

As discussed, the core switches in FIG. 2 are fully connected to the aggregation switches, and the aggregation switches are configured in pairs that are fully connected to a set of TOR switches. FIG. 3 illustrates an enhanced view of two such fully connected tiers of switches. The design presented illustrates a two-tier folded Clos network. As seen in the configuration 300 of FIG. 3, there are effectively two layers of switches: an upper tier or layer of spine switches and a lower tier or layer of edge switches. At least some of the edge switches (e.g., half of the edge switches in a traditional Clos), however, can be utilized as egress switches which pass data on to the network. The egress switches which logically sit at the "top" of the group of switches and pass data "up and out" of the group, such as to aggregation routers or other devices at a higher level tier. Each of the spine switches can be thought of as having a port out the logical "back" side to one of the egress switches, but the egress switches are simply selected from the forty-eight edge servers illustrated in a folded representation of FIG. 3. The egress switches simply have the only connections out of the group of switches, while the remaining edge switches have connections to underlying devices. All traffic into and out of the group of switches thus is routed through one of the three egress switches, although different numbers of switches can be used in different embodiments.

Even though the network may appear similar to the traditional core switch-based design of FIG. 2, the spine switches in this design function as core switches, but do not have any outbound connectivity. The layers of the group of switches have fully meshed connectivity, however, provided by the spine switches. The group of switches without the egress switches could function as a standalone network without any external connectivity. Thus, some of the edge switches can be utilized as egress switches as illustrated. Otherwise, the fact that some of the edge switches are illustrated on the top layer and some on the bottom layer is meaningless from a network connectivity perspective with respect to the spine switches and the other edge switches, and there is very symmetric behavior. The data within the group of switches can be pushed through a number of equidistant, fault-tolerant paths, providing the re-arrangably non-blocking behavior. With the paths being symmetric and equidistant, all the switches can follow the same routing protocol and spread the traffic evenly without a lot of overhead or additional logic. Further, the group of switches can be replicated multiple times within a data center, for example, wherein a Clos-style network effectively manages traffic across all of the groups in the data center.

Because the switches in the tiers of FIG. 3 are fully connected, such that each device on one tier is connected via at least one connection to each device in another tier, the number of cables needed to deploy such a design can be very large. For example, a single tier alone that contains 24 switches each with 48 ports would require 1,152 cables just to fully connect to the other tier. In a data center with many tiers and/or many more devices per tier, the number of cables quickly goes up to thousands or tens of thousands of cables. It can be very expensive to provide, install, and maintain these cables, and diagnosing a problem can be difficult as well as discussed herein. When considering that each of these links may also include a pair of optical modules and separate runs of electrical wiring an optical fiber, the number of locations for potential problem becomes increasingly challenging. Being unable to accurately monitor, diagnose, and debug problems in such a network can lead to significant manual effort and potential downtime of components, which may end up slowing data across the rest of the network.

Figure 4:
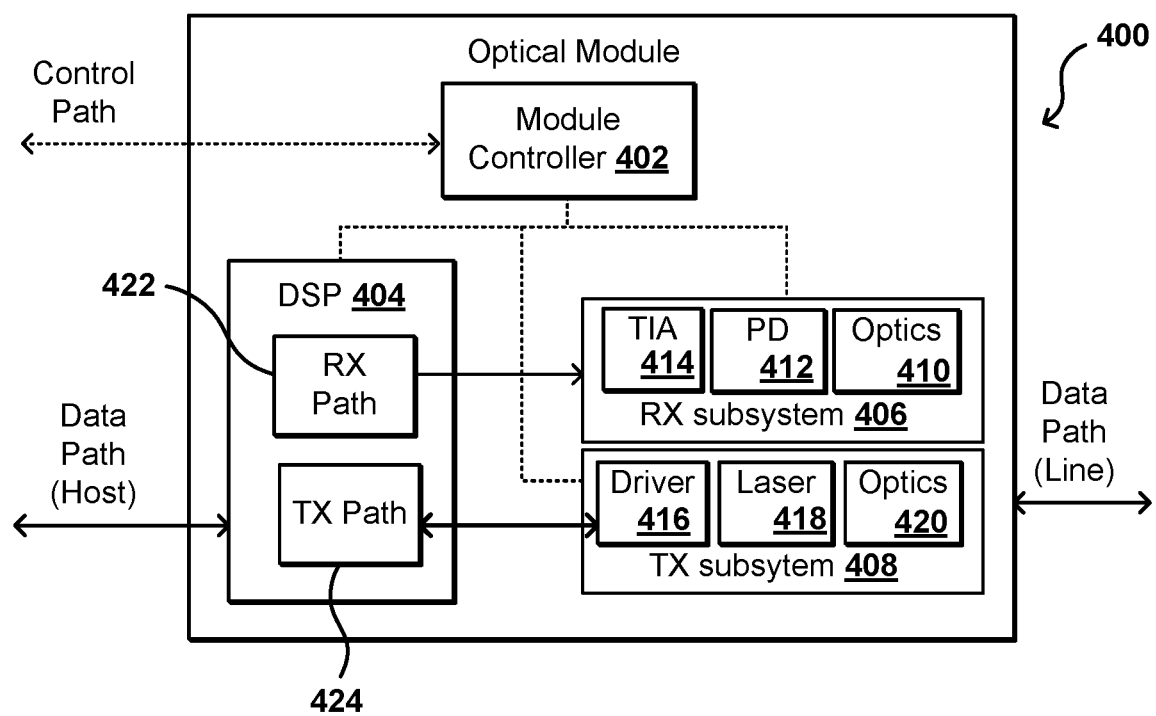
FIG. 4 illustrates an example optical module that can be utilized in accordance with various embodiments.

As mentioned, the functionality offered by optical modules can be leveraged to provide additional monitoring and debugging capabilities that can help to greatly simplify management of such a complex network. FIG. 4 illustrates an example optical module 400 that can be utilized in accordance with various embodiments. In this example an electrical signal is received along a data path from a host to a DSP 404 of the optical module, which can include receiving (RX) components 422. The DSP can perform any processing of the data, then forward the data to the the appropriate transmission (TX) subsystem 408 for transmission over a line-side data path that may send the signal over an optical fiber to be received by another optical module. The TX subsystem, which may be on or separate from the optical module in some embodiments. Optical signals received from the line side can be received to an RX subsystem 406, the propagated to the DSP. The RX subsystem 406 can include, for example, optics 410 for receiving and focusing the signal, a photodiode 412 for detecting the signal, and an amplifier 414 (e.g., a transimpedance amplifier (TIA)) for amplifying an impedance of the signal, among other such options. The transmitting (TX) subsystem 408 can generate an optical signal using, for example, a laser driver 416, a laser 418, and one or more optical elements 420 appropriate for such a networking usage. There can be additional components utilized for receiving and transmitting electrical and optical signals as well as would be apparent to one of ordinary skill in the art in light of the teachings and suggestions contained herein, as may be part of single transceiver or individual receiving and transmitting subsystems, etc. As mentioned, the optical module can include an onboard DSP 404 that can process the electrical signal before the signal is propagated across the optical fiber. As illustrated, the DSP can include portions directed to receiving and transmitting the signal, and can obtain monitoring and debugging data for both portions. The optical module can be a hot-pluggable transceiver in some embodiments, having appropriate electrical and optical interfaces for receiving data communications. A DSP can include various other functionality as well, as may relate to converting between different baud rates, managing forward error correction (FEC), managing encryption, and the like. In some embodiments the DSP receiving a high speed signal can digitize, filter, and reshape the data. In some embodiments, the DSP may also include at least some of these components, such as the driver for the laser component. The optical module 400 also includes a module controller 402, also referred to herein as a microcontroller, which can receive control or command instructions over a respective control path and send data back over the same path. As discussed in more detail elsewhere herein, the control instructions may be received from an ASIC on a connected switch, among other such options.

In this example, the module controller 402 is able to communicate with the DSP 404, as well as the RX and TX subsystems. Since the module controller 402 communicates with the network switch over the control path, this enables the switch to also have access (outside the data path) to the DSP. The switch can then contact the module controller in order to interact with the DSP 404 of the optical module 400. As mentioned, optical modules have conventionally provided limited monitoring functionalities and almost no debugging tools. As a result, the control route between switch and the module was a very simple two-line interface with limited speed. As illustrated, however, the module microcontroller 402 can be used to provide a pass-through connection between the module and the relevant ports of the optical module, such as the main I²C and DSP I/O ports among other options of the TX/RX components. As mentioned, the DSP and microcontroller could share the same I²C line but have assigned different addresses, whereby the network switch could directly access DSP by using its address. Various other options can be used as well as discussed and suggested herein.

In some embodiments, specific protocols can be utilized or defined to eliminate any interference with the normal operation of the optical module 400. In some embodiments the microcontroller can manage different levels of access that can be granted to the network switch. For example, at a lowest level the switch can have read-only access to the DSP, and the control signals from the switch can be at a lower priority compared to microcontroller commands. The microcontroller can pass the read requests from the switch to the DSP, and send the readout results from the DSP back to the switch if it finds its communication port to the DSP is not occupied. This level of access can be used to for monitor different sections of the links. For example, the module DSP could separately monitor the signal-to-noise ratio (SNR) of each channel of the data stream it receives on the host side and on the link side. When such data is available to the switch, it can verify the quality of different sections of the link, since it is able to diagnose both the optical and electrical links. If the SNR on the host side of DSP is bad (e.g., below a desired threshold), this can indicate that there is some problem with the signal quality received at the module DSP. The switch can check the SNR on its ASICs and if the switch SNR is good (e.g., at or above a desired threshold), this can indicate that there is problem with the link between switch and the module, such as a problem with high-speed connection between the switch to the module, an incorrect format for the signal, or high crosstalk affecting the signal, among other such options. On the other hand, when the switch receives a high-speed signal with poor quality from the DSP, the switch can check the SNR on the DSP to determine whether the signal was further degraded in the electrical link from DSP to the switch. Having such a monitoring tool on the DSP for different optical channels on the link side could quickly reveal, for example, the quality of the optical fiber connections for different connection types, including wavelength-division multiplexing (WDM) links. For example, the SNR of the signal received on the DSP line side could be monitored and the degradation of that signal could be an indication of higher loss or poor optical connection between the modules.

At a higher level of access, the module controller 402 of the optical module 400 can release its control over the DSP, such that the network switch is instead in full (or at least partial) control of module DSP. This can provide a full debugging mode of operation that can be used to pinpoint the location of a problem in the network. For example, a network switch could generate different PRBS signals on a port and the module DSP could measure BER and signal quality for each channel on that port. The resulting data can be useful to diagnose the problem with the host side of the network link. For example, the distribution of errors could be checked to determine whether the host side of the link is suffering from random or burst error. Also, checking each channel while the other channels are off, or while all the channels are working, could verify whether crosstalk from adjacent channels is the source of the problem. In other scenarios, the module could generate PRBS and the BER for each channel can be measured on the other side of the link in the receiving module DSP. The results can indicate, for example, whether the optical link is suffering from a burst error or a random error. Such an approach to directly controlling the DSP and utilizing its APIs can be used to monitor and ensure proper interoperation between various network components, as well as to implement network monitoring tools, utilize new link debugging tools, and perform proper recovery in the case of catastrophic failures.

Figure 5:
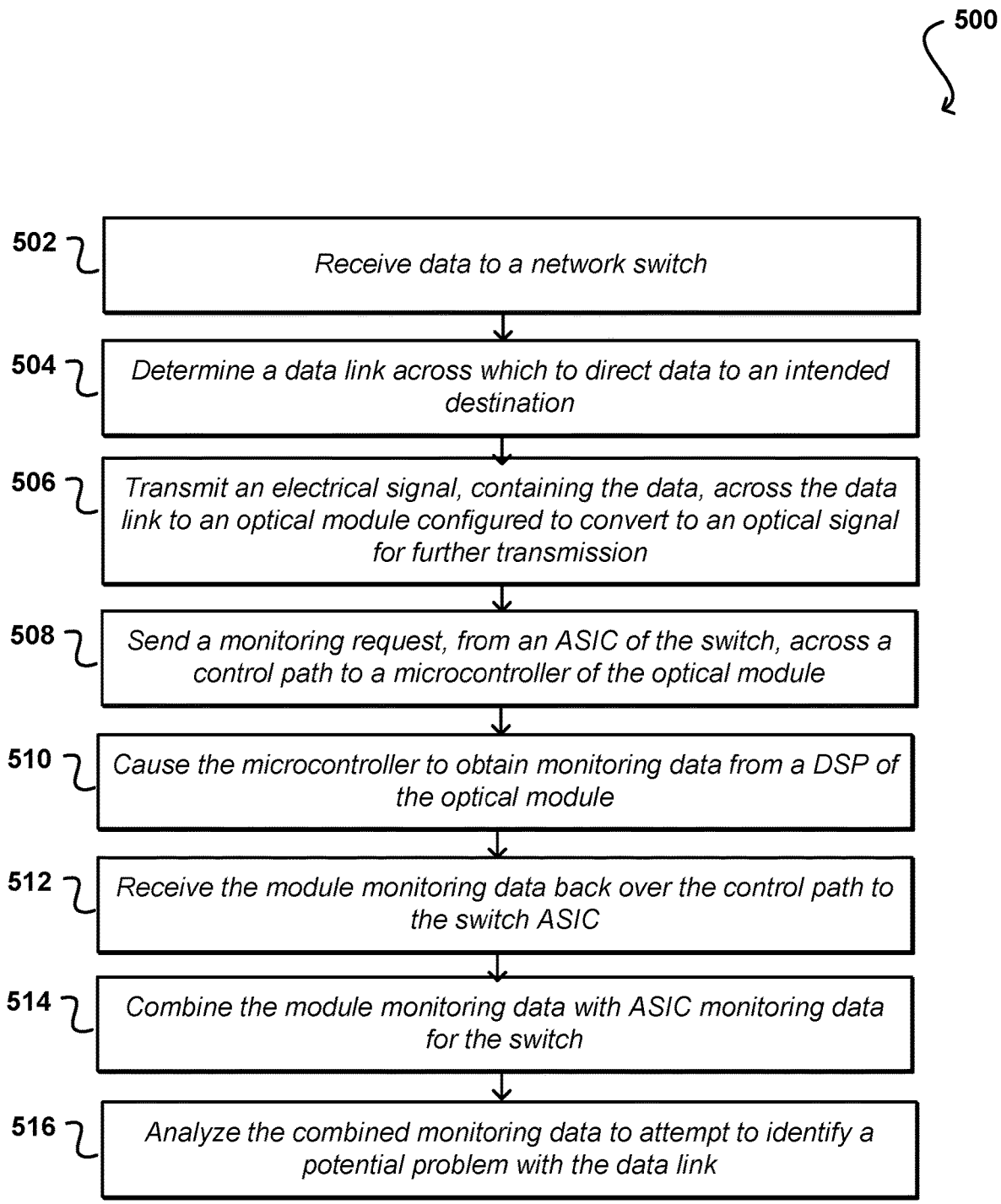
FIG. 5 illustrates an example process for monitoring performance of a set of network components that can be utilized in accordance with various embodiments.

FIG. 5 illustrates an example process 500 for monitoring performance of a set of network components that can be utilized in accordance with one embodiment. It should be understood for this and other processes discussed herein that there can be additional, alternative, or fewer steps performed in similar or alternative orders, or in parallel, within the scope of the various embodiments unless otherwise stated. In this example, data is received 502 to a network switch. This can be any appropriate data, communication, or transmission as discussed herein that is to be propagated across a set of network components along a network data path in this example. A data link can be determined 504 along which the data should be directed towards an intended or specified destination, such as a target network address. In the current example, the data link can include both electrical and optical transmission segments. From the network switch, an electrical signal can be transmitted 506 that contains the data to be transmitted. The signal can be transmitted to an optical module that is configured to convert the signal to an optical signal in order to enable the data to be further transmitted along the data path to the destination. In order to monitor a performance of this and other such transmissions, a monitoring request can be sent 508 from an ASIC of the switch, across a control path to a microcontroller of the optical module. As mentioned, in some embodiments this can be a separate, slower or lower bandwidth communications path between the network switch and the optical module. The microcontroller of the optical module can be caused 510 to obtain monitoring data from a digital signal processor (DSP) of the optical module. The DSP may obtain or generate various types of monitoring or debugging data as discussed herein, and some or all of this data may be obtained by the microcontroller. The obtained module monitoring data can be received 512 back over the control path to the ASIC of the network switch. The module monitoring data can be aggregated 514 with monitoring data from the switch, as may be obtained or generated by the switch ASIC. As discussed elsewhere herein, the monitoring data from the switch can include an amount of traffic through the switch, a number of dropped packets or determined packet errors, and the like. The combined monitoring data from the module and switch can then be analyzed 516 to attempt to identify any potential problem with the data link, including the switches, optical modules, wires, or fibers along the path. The ability to obtain monitoring information from the optical module enables more granular information to be obtained than would otherwise be possible from the network switch alone.

Figure 6:
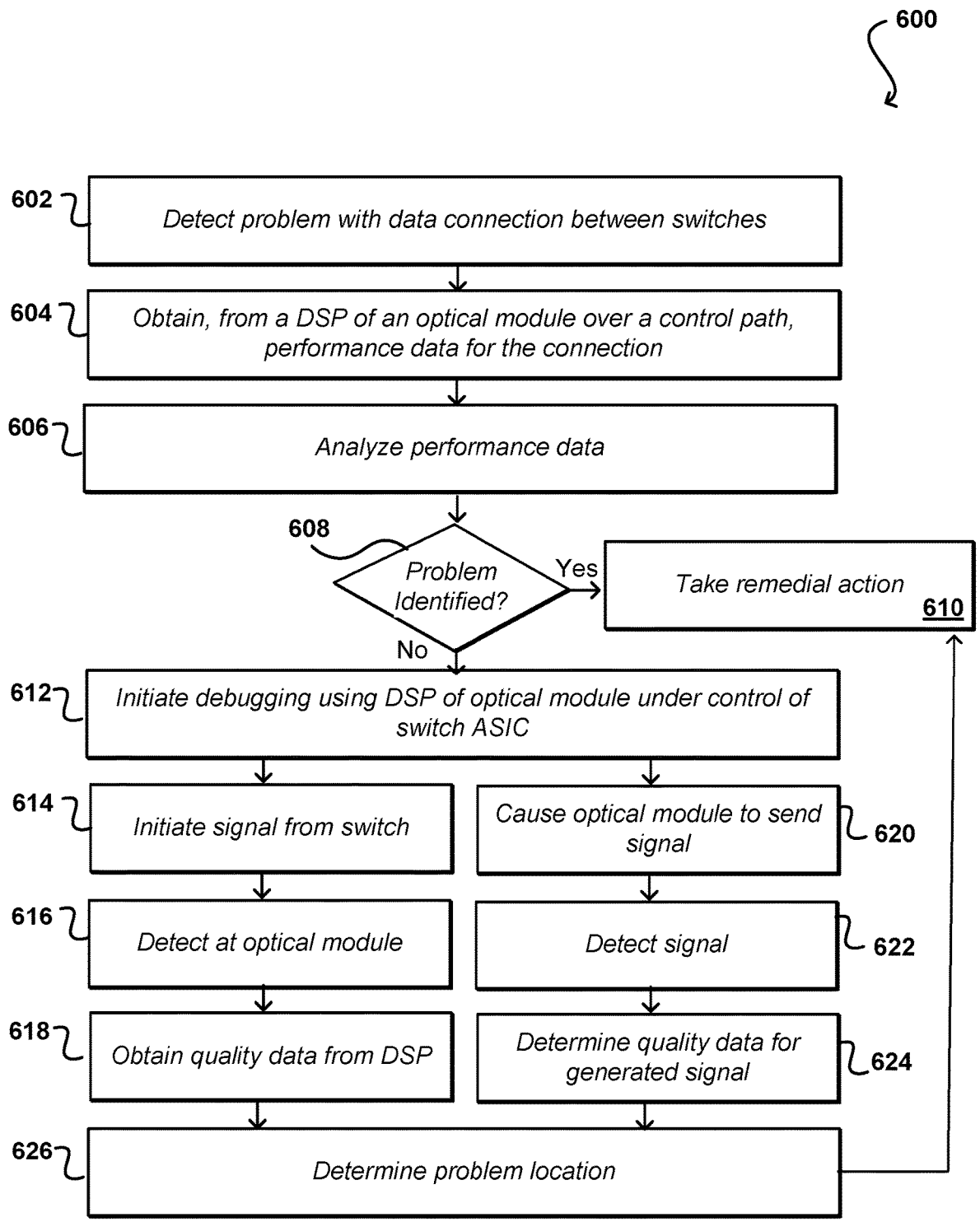
FIG. 6 illustrates an example process for debugging a set of network components that can be utilized in accordance with various embodiments.

FIG. 6 illustrates an example process 600 for debugging a potential problem with a set of network components that can be utilized in accordance with one embodiment. As mentioned, such a process can be performed by a network management service, a debugging service, functionality on the network switch, or another such network component, device, or service. In this example, a problem is detected 602 with a data connection between a pair of switches, or elsewhere along a communications path. The problem might be detected through monitoring information in some embodiments, such as may be obtained using the process of FIG. 5. In order to attempt to debug the problem, performance data for the connection (e.g., signal-to-noise ratio and other such data) can be obtained 604, such as from a DSP of an optical module over a control path between the optical module and a corresponding network switch. The performance data can be aggregated with other performance data as well, as may be obtained from the network switch or a network management service, among other such options. As mentioned, a network switch or management service can obtain conventional performance data relating to traffic from switch to switch through the system, which can provide valuable insight when aggregated with the monitoring and debugging data from the DSPs on the optical modules that can provide data for different portions of the paths between switches, which provides for greater granularity. The performance data can be analyzed 606 to attempt to identify the problem. If the problem is determined 608 to be identified then appropriate remedial action can be taken 610 in this example. As mentioned, identifying the problem may include determining that an unacceptable amount of signal loss occurs over a specific run of optical fiber, a laser is not producing a signal of sufficient strength, a connection loss is occurring over an electrical wire between a specific switch and optical module, and the like. The data can be used to determine the last point at which performance was successful, and can determine how performance is unsuccessful and where, and can use this (and other) information to pinpoint the problem. The remedial action can include, for example, automatically adjusting one or more settings along the communications path, such as a setting of a network switch or optical module, in order to attempt to improve the performance. In other situations where such an adjustment may not be sufficient, network traffic may be directed elsewhere along at least one other communications path, whereby manual adjustment can be made to attempt to repair or replace an identified problematic component.

If the problem is unable to be identified from the collected performance information, further debugging can be initiated 612 using the DSP of the optical module under control of the switch ASIC. During debugging, the ASIC may have full control of the DSP in some embodiments. This may involve one or more processes done in sequence or parallel. For example, an electrical signal can be initiated 614 from the network switch and detected 616 at the optical module. Quality or performance data can be obtained 618 for the signal from the DSP of the optical module, using the onboard performance determination functionality. The quality data can be received back over the control path. The optical module can also be caused 620 to send a signal as well. In one example this can be an electrical signal sent back to the network switch that can be detected and analyzed by the network switch. In another embodiment this can be an optical transmission that is sent along the optical fiber then sent back from an optical module on the other end, among other such options. It should be noted that such a mode of operation is possible with proper coordination of the network management and monitoring system. Such operation is not a trivial task, and the overall network management can provide the proper harmony between these separate modules to make this possible. In addition to determining quality of the data flow, a pattern can be generated in the signal and the quality of the pattern in the detected signal analyzed to determine errors in the transmitted or received data. The signal can be detected 622 by the appropriate component and the quality of that signal determined 624. This information can then be used to at least determine 626 the location or source of the problem, such as the wire, optical fiber, module signal generation components, etc. Based at least in part upon that information, an appropriate remedial action can be taken as discussed herein.

As mentioned, there may be degradation in communications resulting from a broken link where no data is received, or a problem with intermittent drop-offs or data corruption, among other such options. The control signal is communicated over independent lines and with much lower speed, which are less prone to problems than the main high speed connections in at least some embodiments. Such an approach attempts to identify a root cause of the degradation and, where possible, make adjustments to eliminate the degradation or otherwise obtain an at least an acceptable level of performance. If, for example, it is determined that there is a small bit rate error but the error is gradually increasing, some prevention can be put in place such that the data is redirected or the link replaced before the error becomes unacceptable. In at least some embodiments, some of the traffic can be directed over other links as well in order to reduce the impact of the error. Debugging can also be used in situations where problems were detected independent of the monitoring, such as where there was a lost connection but where prior to the loss the performance was acceptable. The debugging can attempt to quickly pinpoint the problem so that not only can that link be quickly fixed, but that a type of problem can be determined to attempt to prevent similar problems from occurring elsewhere across the network. In some cases, the DSP itself could have a bug or could become trapped in an unacceptable state. Having direct access to the DSP can directly reveal such problems, and in at least some cases can fix or otherwise automatically address those problems. In the event that a DSP operation crashes, full control by the switch could help to retrieve a log or memory dump of the operation leading to the crash, which may be very helpful in debugging and fixing the possible problem(s) with the DSP.

Figure 7:
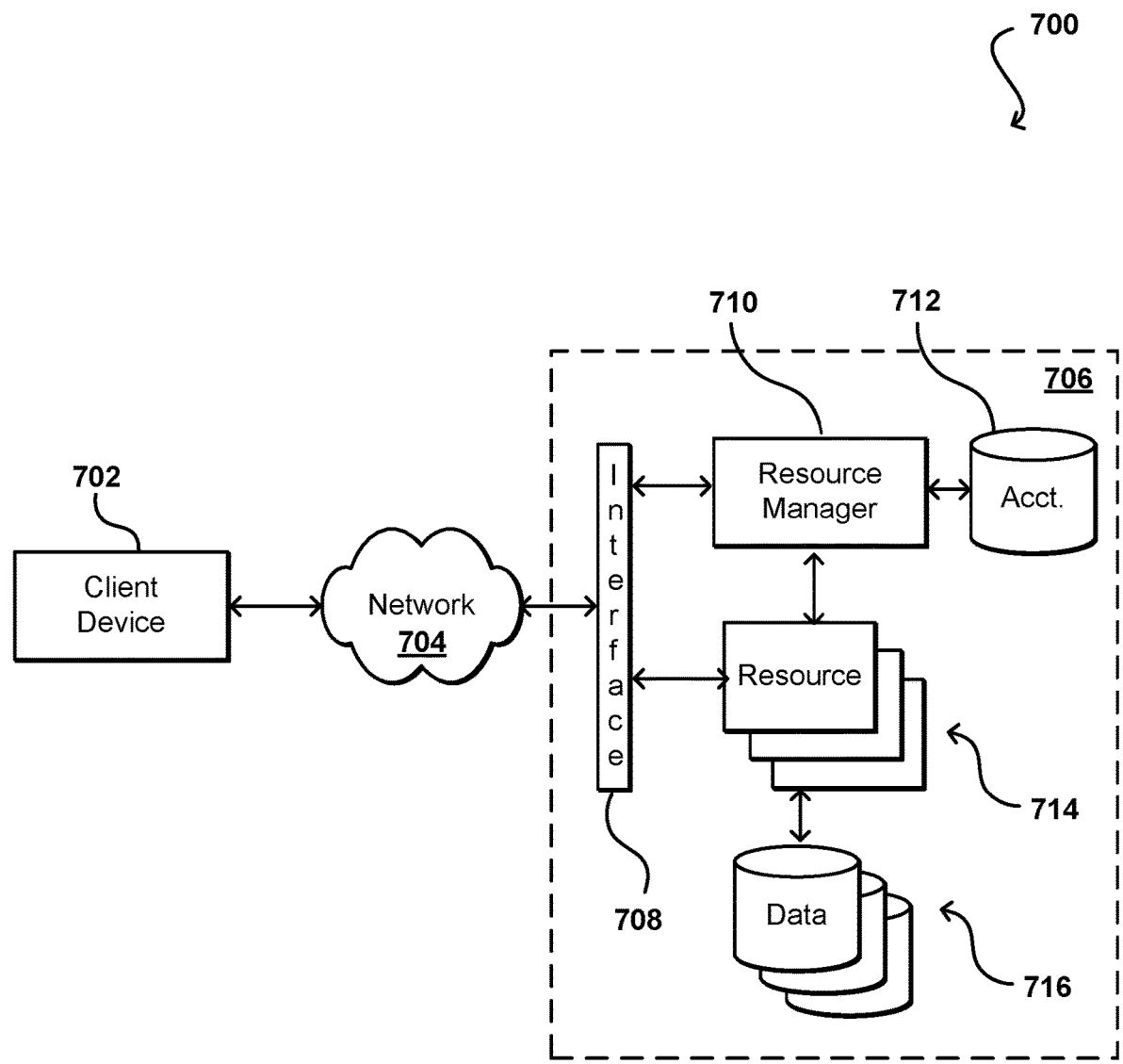
FIG. 7 illustrates an example environment in which aspects of the various embodiments can be implemented.

FIG. 7 illustrates an example environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 8:
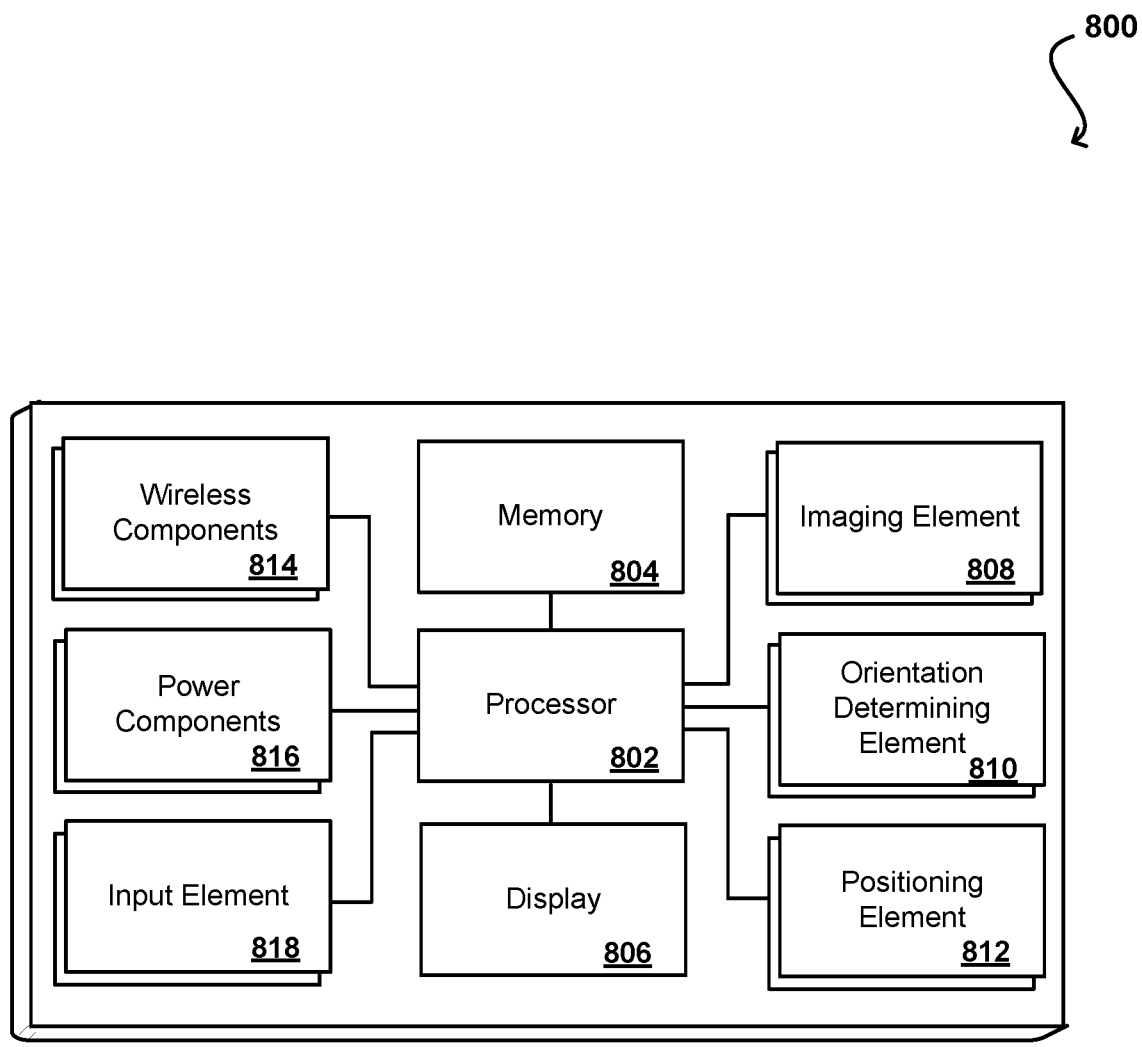
FIG. 8 illustrates example components of a computing device that can be used to implement aspects of the various embodiments.

FIG. 8 illustrates a set of basic components of an example electronic computing device 800 that can be used to implement aspects of the various embodiments. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   transmitting data along a data path between a network switch and an optical module, the data to be transmitted to a target destination;
   transmitting, over a control path from the network switch to a microcontroller of the optical module, a request for performance data relating to the transmitting of the data;
   causing the performance data, generated by a digital signal processor (DSP) of the optical module, to be transmitted over the control path and received by the network switch;
   analyzing the performance data from the DSP of the optical module to determine a current performance of the data path;
   detecting a failure along the data path based on the current performance;
   transmitting, along the control path from the network switch to the microcontroller of the optical module, a request for diagnostic information generated by the DSP, the diagnostic information relating to a quality of a test transmission sent, or received, by the optical module;
   analyzing the diagnostic information to determine a location of the failure along the data path; and
   performing a remedial action corresponding to the location of the failure.

2. The computer-implemented method of claim 1, further comprising:
   transmitting, with the request for diagnostic information, a request for the optical module to perform one of:
      detecting an electrical signal to be generated by the network switch,
      generating an electrical signal to be detected by the network switch, or
      generating an optical signal to be transmitted to, and returned by, a second optical switch along the data path.

3. The computer-implemented method of claim 2, further comprising:
   providing a pattern to be included in the electrical signal to be generated by the network switch or the optical signal to be generated by the network switch, the quality of the test transmission relating to the pattern as provided.

4. The computer-implemented method of claim 1, further comprising:
   analyzing additional performance and diagnostic data from the network switch to pinpoint the location of the failure along the data path, the location corresponding to the network switch, the optical module, a component of the optical module, an electrical communications wire between the network switch and the optical module, or an optical fiber between the optical module and a second optical module connected to the optical fiber.

5. The computer-implemented method of claim 1, further comprising:
   detecting the failure along the data path using the performance data from the DSP of the optical module or network state information received from a network management service.

6. A computer-implemented method, comprising:
   detecting a failure along a data path from a network switch to an optical module;
   transmitting, along a control path from the network switch to a microcontroller of the optical module, a request to obtain diagnostic data from a digital signal processor (DSP) of the optical module;
   receiving, over the control path from the optical module to the network switch, the diagnostic data; and
   analyzing the diagnostic data from the DSP of the optical module to determine a location of the failure along the data path.

7. The computer-implemented method of claim 6, further comprising:
   transmitting, with the request to obtain the diagnostic data, a request for the optical module to:
      detect an electrical signal to be generated by the network switch,
      generate an electrical signal to be detected by the network switch, or
      generate an optical signal to be transmitted to, and returned by, a second optical switch along the data path.

8. The computer-implemented method of claim 7, further comprising:
   providing a pattern to be included in the electrical signal to be generated by the network switch or the optical signal to be generated to be generated by the network switch, the diagnostic information relating to a quality of a test transmission sent, or received, by the optical module, the quality of the test transmission relating to the pattern as provided.

9. The computer-implemented method of claim 8, wherein the pattern includes a pseudo-random binary sequence (PRBS) and the diagnostic data relates to a bit error rate (BER) determined for the pattern as detected.

10. The computer-implemented method of claim 6, further comprising:
    performing a remedial action corresponding to the location of the failure, the remedial action including adjusting a network setting or redirecting network traffic around the location of the failure.

11. The computer-implemented method of claim 6, further comprising:
    analyzing additional performance and diagnostic data from the network switch to determine the location of the failure along the data path, the location corresponding to the network switch, the optical module, a component of the optical module, an electrical communications wire between the network switch and the optical module, or an optical fiber between the optical module and a second optical module connected via the optical fiber.

12. The computer-implemented method of claim 6, further comprising:
    transmitting, over the control path from the network switch to the optical module, a request for performance data, the performance data relating to data transmitted along the data path from the network switch to the optical module;
    causing the performance data to be obtained from the DSP of the optical module and transmitted over the control path;
    receiving, over the control path from the optical module to the network switch, the performance data; and
    analyzing at least the performance data from the DSP of the optical module to determine a current performance state of the data path.

13. The computer-implemented method of claim 12, further comprising:
adjusting at least one setting of the network switch or the optical module in order to maintain a desired performance state of the data path.

14. The computer-implemented method of claim 6, further comprising:
enabling one or more debugging tools and data reporting by the DSP as functionalities of the DSP, the enabling including transferring a plurality of parameters and settings from an application-specific integrated circuit (ASIC) of the network switch to the DSP.

15. The computer-implemented method of claim 6, wherein the optical module is configured to receive an electrical signal, transmitted by the network switch along an electrical portion of the data path, and convert the electrical signal to an optical signal to be transmitted along an optical fiber portion of the data path.

16. A system, comprising:
a network switch;
an optical module connected to the network switch by a data path for transmitting network data, the optical module further including a microprocessor connected to the network switch by a control path, the optical module further including a digital signal processor (DSP) connected to the microprocessor;
a processor; and
memory including instructions that, when executed by the processor, cause the system to:
transmit, over the control path from the network switch to the optical module, a request for performance data, the performance data relating to data transmitted along the data path from the network switch to the optical module;
cause the microprocessor of the optical module to obtain the performance data from the DSP of the optical module via the control path;
receive, over the control path from the optical module to the network switch, the performance data; and
analyze at least the performance data from the DSP of the optical module to determine a current performance state of the data path.

17. The system of claim 16, wherein the instructions when executed
further cause the system to:
adjust at least one setting of the network switch or the optical module in order to maintain a performance state of the network path with a minimal level of degradation to the network path.

18. The system of claim 16, wherein the instructions when executed further cause the system to:
detect a failure along the data path; and
transmit, along the control path from the network switch to the microcontroller of the optical module, a request to obtain diagnostic information from the DSP, the diagnostic information usable to pinpoint a location of the failure along the data path.

19. The system of claim 18, wherein the instructions when executed further cause the system to:
transmit, with the request to obtain the diagnostic information, a request for the optical module to perform at least one of:
detecting an electrical signal to be generated by the network switch,
generating an electrical signal to be detected by the network switch, or
generating an optical signal to be transmitted to, and returned by, a second optical switch along the data path.

20. The system of claim 19, wherein the instructions when executed further cause the system to:
enable one or more debugging tools and data reporting by the DSP as functionalities of the DSP, the enabling including transferring a plurality of parameters and settings from an application-specific integrated circuit (ASIC) of the network switch to the DSP.

* * * * *